United States Patent
Newhouse

(10) Patent No.: US 9,702,468 B2
(45) Date of Patent: Jul. 11, 2017

(54) SEAL SYSTEM INCLUDING WATER MANAGEMENT FEATURE

(71) Applicant: LIPPERT COMPONENTS, INC., Elkhart, IN (US)

(72) Inventor: Norman L. Newhouse, Mishawaka, IN (US)

(73) Assignee: LIPPERT COMPONENTS, INC., Elkhart, IN (US)

( * ) Notice: Subject to any disclaimer, the term of this patent is extended or adjusted under 35 U.S.C. 154(b) by 96 days.

(21) Appl. No.: 14/972,327

(22) Filed: Dec. 17, 2015

(65) Prior Publication Data

US 2016/0178060 A1 Jun. 23, 2016

Related U.S. Application Data

(60) Provisional application No. 62/092,977, filed on Dec. 17, 2014.

(51) Int. Cl.
| | |
|---|---|
| *F16J 15/02* | (2006.01) |
| *F16J 15/16* | (2006.01) |
| *F16J 15/32* | (2016.01) |
| *B60P 3/34* | (2006.01) |
| *B60R 13/06* | (2006.01) |
| *B60R 13/07* | (2006.01) |
| *B60J 10/00* | (2016.01) |
| *B60J 10/25* | (2016.01) |
| *F16J 15/3204* | (2016.01) |
| *B60J 10/21* | (2016.01) |

(52) U.S. Cl.
CPC ............... *F16J 15/16* (2013.01); *B60J 10/00* (2013.01); *B60J 10/25* (2016.02); *B60P 3/34* (2013.01); *B60R 13/06* (2013.01); *B60R 13/07* (2013.01); *B60J 10/21* (2016.02); *F16J 15/022* (2013.01); *F16J 15/025* (2013.01); *F16J 15/3204* (2013.01)

(58) Field of Classification Search
CPC .. B60P 3/34; B60R 13/06; B60R 13/07; B60J 10/00; B60J 10/21; B60J 10/25; F16J 15/022; F16J 15/025; F16J 15/3204
See application file for complete search history.

(56) References Cited

U.S. PATENT DOCUMENTS

| | | |
|---|---|---|
| 5,237,782 A | 8/1993 | Cooper |
| 5,785,373 A | 7/1998 | Futrell et al. |
| 6,048,016 A | 4/2000 | Futrell et al. |
| 6,070,634 A | 6/2000 | Sandstrom et al. |
| 6,561,570 B2 | 5/2003 | Gehman et al. |
| 6,966,590 B1 | 11/2005 | Ksiezopolki et al. |
| 7,380,854 B1 | 6/2008 | Hanser et al. |
| 7,540,116 B1 | 6/2009 | Martinson |
| 7,614,676 B2 | 11/2009 | Ksiezopolski et al. |

(Continued)

*Primary Examiner* — Nicholas L Foster
(74) *Attorney, Agent, or Firm* — Barnes & Thornburg LLP

(57) ABSTRACT

A seal system includes one or more corner seals and a sill seal attachable to the corner seal(s). The sill seal includes a horizontal portion, an outer flange depending from the horizontal portion, an oblique portion extending obliquely from the horizontal portion, and an inner flange extending upwardly from the horizontal portion. A wiper extends upwardly from the inner flange. The inner flange and oblique portion cooperate to form a trough. One or more weep holes are formed in the inner flange to allow for communication of water from the trough to the other side of the inner flange.

14 Claims, 2 Drawing Sheets

(56) References Cited

U.S. PATENT DOCUMENTS

| | | | |
|---|---|---|---|
| 7,614,677 B2 | 11/2009 | Ksiezopolski et al. | |
| 7,651,144 B2 * | 1/2010 | Clark | B60P 3/34 |
| | | | 277/644 |
| 7,802,834 B2 | 9/2010 | Cadena et al. | |
| 8,366,168 B1 | 2/2013 | Ksiezopolski et al. | |
| 8,382,124 B2 * | 2/2013 | Ksiezopolski | B60J 10/00 |
| | | | 277/637 |
| 8,408,625 B1 | 4/2013 | Ksiezopolski et al. | |
| 8,701,351 B2 | 4/2014 | Siegel | |
| 2002/0078634 A1 | 6/2002 | McManus et al. | |
| 2006/0091687 A1 | 5/2006 | Schoffner et al. | |
| 2008/0116707 A1 * | 5/2008 | Boaz | B60P 3/34 |
| | | | 296/26.01 |
| 2009/0134670 A1 * | 5/2009 | Clark | B60P 3/34 |
| | | | 296/213 |
| 2012/0032406 A1 * | 2/2012 | Ksiezopolski | B60J 10/00 |
| | | | 277/648 |
| 2014/0097578 A1 | 4/2014 | Young et al. | |

\* cited by examiner

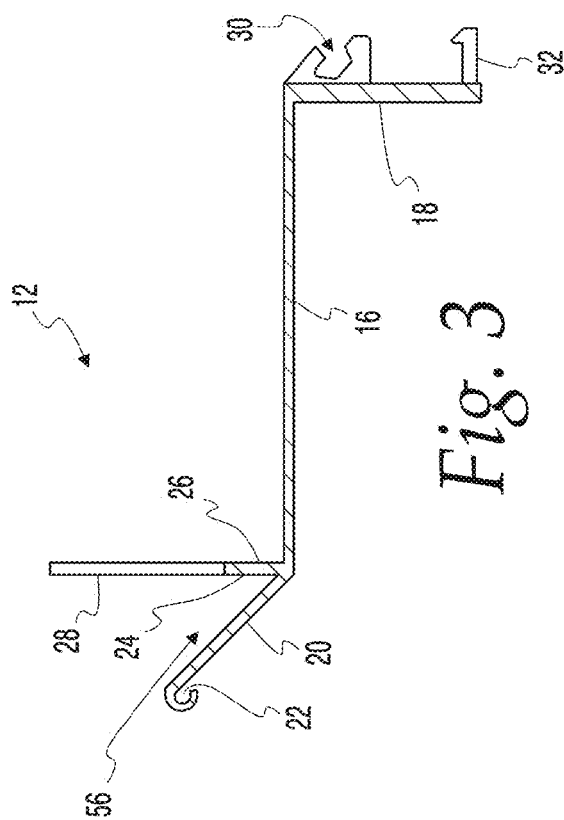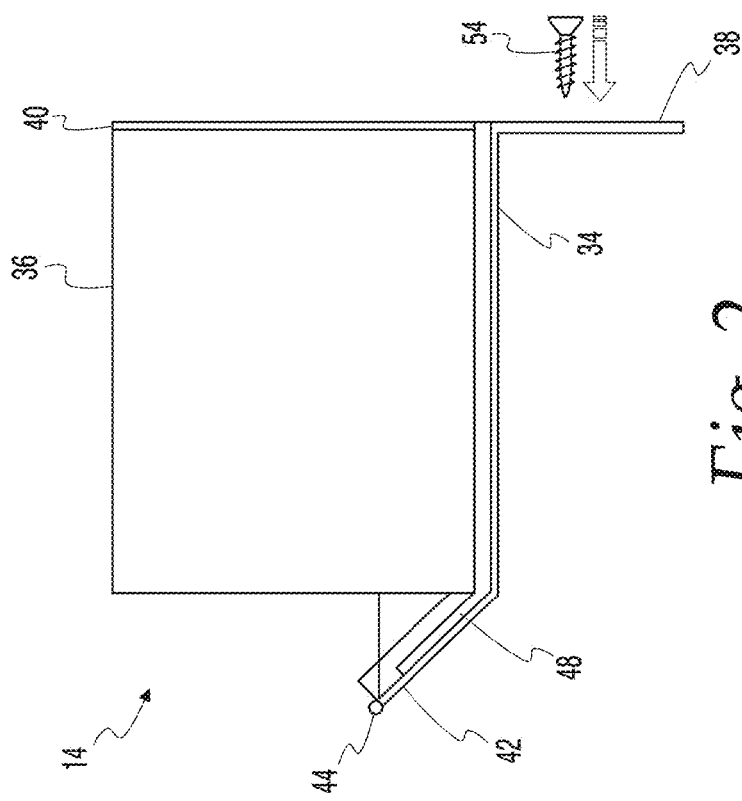

SEAL SYSTEM INCLUDING WATER MANAGEMENT FEATURE

CROSS-REFERENCE TO RELATED APPLICATIONS

This application claims benefit of U.S. Provisional Patent Application No. 62/092,977, filed on Dec. 17, 2014, and incorporates by reference the disclosure thereof in its entirety.

BACKGROUND AND SUMMARY OF THE DISCLOSURE

A recreational vehicle (RV) may include a slide out room that can be extended and retracted through a corresponding opening in the sidewall of the RV. Such a slide-out room typically has the form of a six-sided box having a floor, a roof, an outer wall parallel to the side wall of the RV containing the opening, and opposing side walls perpendicular to the side wall of the RV containing the opening. The sixth side of the box, facing the interior of the RV, is open to allow passage between the interior of the RV and the interior of the slide-out room.

An inner flange may extend peripherally about the floor, roof, and opposing side walls of the slide-out room proximate the open side thereof. A bulb seal or other form of seal may be disposed between the inner flange and the inside surface of the RV's sidewall to effect a seal between the interior of the RV and the environment when the slide out room is extended.

An outer flange may extend peripherally about the floor, roof, and opposing side walls of the slide-out room proximate the outer wall thereof. A bulb seal or other form of seal may be disposed between the outer flange and the outside surface of the RV's sidewall to effect a seal between the interior of the RV and the environment when the slide out room is retracted.

Wipers may be provided to wipe moisture off the outer surfaces of the floor, roof and/or opposing side walls of the slide out room when the slide out room is retracted. Any number of factors may cause at least a portion of the moisture wiped by the wipers to infiltrate the RV when the room is being retracted. A seal system positioned at the sill of the opening in the side wall of the RV may be configured to manage this moisture.

BRIEF DESCRIPTION OF THE DRAWINGS

FIG. 2 is a side elevation view of the corner seal of FIG. 1; and FIG. 3 is a side elevation view of the sill seal of FIG. 1.

DETAILED DESCRIPTION OF THE DRAWINGS

Figure 1:
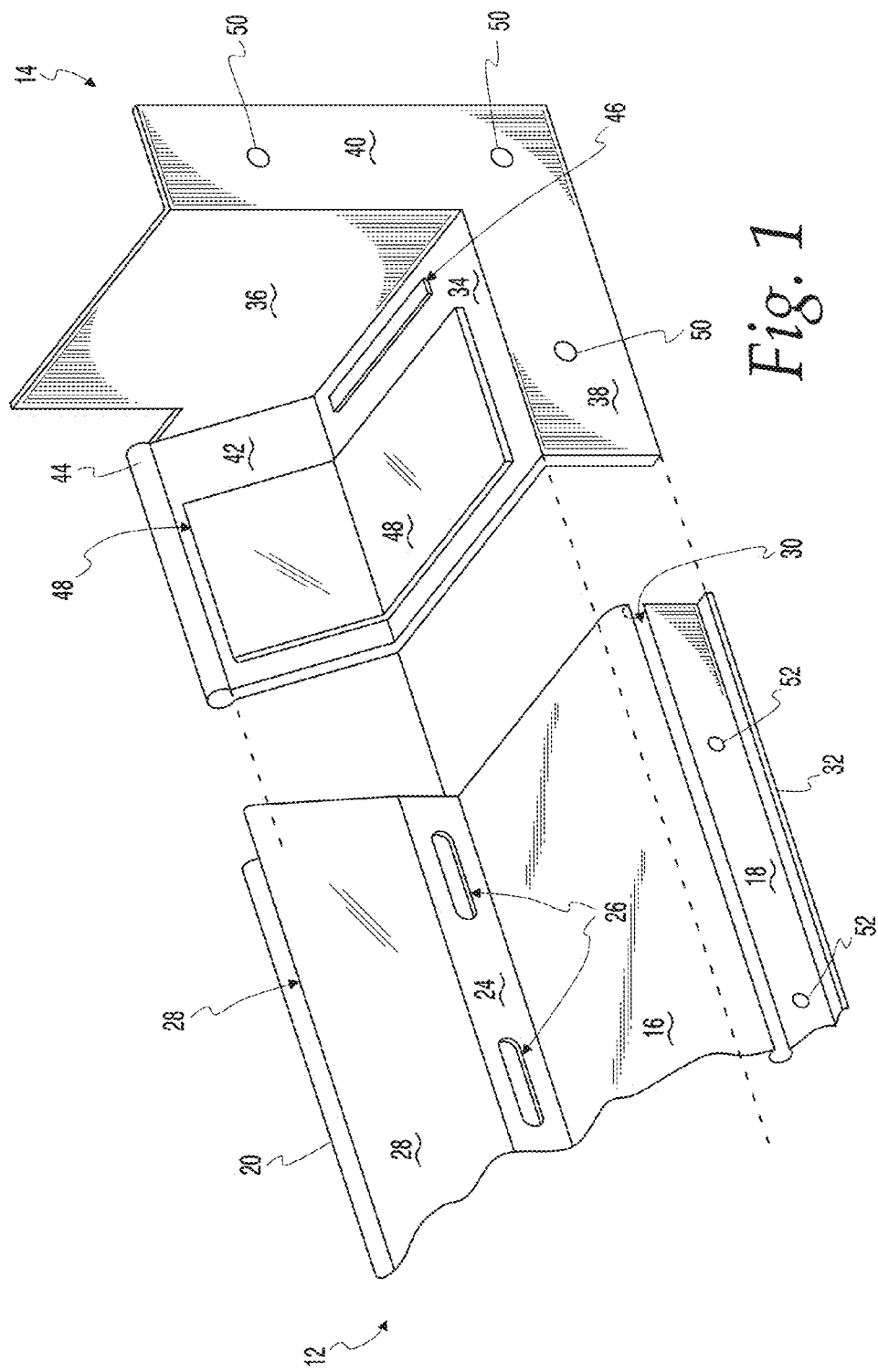
FIG. 1 is a perspective view of an illustrative seal system, including a sill seal and a corner seal configured for installation in an opening in a sidewall of an RV or other structure

Terms of orientation such as upper, lower, inner, outer, horizontal, vertical, upward, downward, lateral, and the like, as used herein should be construed as describing relative, rather than absolute, orientation, unless context dictates otherwise.

The drawings show an illustrative embodiment of a seal system 10. The seal system 10 includes an elongated sill seal 12 and a corner seal 14 configured for installation in an opening in a side wall of structure, for example, a recreational vehicle.

The sill seal 12 includes a horizontal portion 16, a first (or outer) vertical flange 18 extending downwardly from or near an outer edge of the horizontal portion, an oblique portion 20 extending upwardly from or near an inner edge of the horizontal portion at an obtuse angle thereto, and a second (or inner) vertical flange 24 extending upwardly from or near the inner edge of the horizontal portion. Although the first and second flanges 18, 24 are referred to herein as vertical flanges, they may be oriented otherwise with respect to the horizontal portion 16 as may be necessary or desired to facilitate attachment of the sill seal 12 to a structure, as discussed further below. At least a portion of the free end of the oblique portion 20 is curled back upon itself, thereby defining an elongated groove 22 on the underside of the oblique portion. The groove 22 is configured to receive a bead 44 in a snap fit manner, as will be discussed further below. A flexible wiper 28 extends upwardly from the free end of the inner flange 24.

The oblique portion 20 and the inner flange 24 cooperate to define a trough 56. One or more weep holes 26 are formed in the inner flange 24. The weep holes 26 are located near or abutting the interface of the inner flange 24 with the horizontal portion 16 and the oblique portion 20. The weep holes 26 are configured to allow water to be communicated from the trough 56 to the side of the inner flange 24 opposite the trough. The weep holes 26 are shown as being oval but could have other shapes, for example, round or rectangular. The horizontal portion 16, at least a lower portion of the oblique portion 20, and the joint connecting the horizontal portion and the oblique portion are continuous and unperforated to preclude passage of water there through.

A tab receiving channel 30 faces outward from an upper portion of the outer flange 18. A first latch member 32 extends outwardly from a lower portion of the outer flange 18. The tab receiving channel 30 and first latch member 32 are configured for receiving a seal member, for example, a bulb seal as disclosed in commonly-owned U.S. patent application Ser. No. 14/923,663, filed on Oct. 23, 2015, the disclosure of which is incorporated by reference in its entirety herein. One or more screw holes 52 may be provided in the outer flange 18 for receiving screws 54 or other fasteners for attaching the sill seal 12 to the side wall of the structure.

The sill seal 12 may be formed, for example, as an extrusion and cut to any desired length. The wiper 28 may be co-extruded with the balance of the sill seal 12. Alternatively, the sill seal 12 may be extruded without the wiper 28. In such embodiments, the wiper 28 may be separately extruded or otherwise formed and post-attached to the balance of the sill seal 12. The wiper 28 may be made of a flexible and resilient material, for example, TPO, TPE, TPV or other rubber or plastic material. The balance of the sill seal 12 may be made of another material, for example, TPO, TPV, TFPPE or other rigid or semi-rigid rubber or plastic material. In an embodiment, the entirety of the sill seal, including the wiper 28, could be made of, for example, semi-rigid or flexible rubber or plastic material.

The corner seal 14 includes a horizontal portion 34, a vertical portion 36, extending upwardly from or near an end of the horizontal portion, a lower vertical flange 38 extending downwardly from or near an outer edge of the horizontal portion, a lateral vertical flange 40 extending laterally from or near an outer edge of the vertical portion, and an oblique portion 42 extending upwardly from an inner edge of the horizontal portion at an obtuse angle thereto. A lower portion of the vertical portion 36 extends inwardly to, and is connected to, an end of the oblique portion 42. The horizontal portion 34, at least a lower portion of the vertical portion 36, at least a lower portion of the oblique portion 42, and the joints connecting the foregoing portions of the corner seal are continuous and unperforated to preclude passage of liquid therethrough.

A free edge of the oblique portion 42 terminates in an elongated bead 44. The bead 44 is configured in a manner complementary to the groove 22 so that the bead 44 may be received in the groove 22 in a snap-fit manner. A stop 46 member may be provided on the horizontal portion 34 near the interface between the horizontal portion and the vertical portion 36. The stop member 46 is configured to locate the end of the sill seal 12 when the sill seal is assembled to the corner seal 14, as discussed further below. An optional adhesive 48, for example, a double sided tape, may be disposed on an upper surface of the horizontal portion 34 and the oblique portion 42. (Alternatively, the adhesive 48 may be disposed on corresponding undersides of the horizontal and oblique portions 16, 20 of the sill seal, as will become apparent from the discussion below.) The adhesive 48 is shown as extending toward, but not to, the outer edge of the horizontal portion 34 from which the lower outer flange 38 depends. In other embodiments, the adhesive 48 could extend to the outer edge of the horizontal portion 34. In further embodiments, the adhesive 48 could extend along a portion of the height of the lower outer flange 38, as well. The adhesive 48 may be configured to provide a liquid-tight seal between adjacent portions of the sill seal 12 and the corner seal 14. One or more holes 50 may be provided in the lower outer flange 38 and/or lateral outer flange 40 for receiving screws or other fasteners for attaching the corner seal 14 to the side wall of the structure.

The corner seal 14 is shown as being configured for installation into a lower right corner of the opening in the side wall of the structure. A corner seal for a lower left corner of the opening could be configured as the mirror image of the corner seal 14.

The seal system 10 may be installed into the opening in the side wall of the structure by placing the corner seal 14 in the corner of the opening with the horizontal portion 34 abutting the sill of the opening and the vertical portion 36 abutting the jamb of the opening. Screws or other fasteners (not shown) may be inserted through the holes 50 to secure the corner seal 14 to the side wall. In an embodiment, holes 50 may be omitted and screws or other fasteners may be driven directly through the outer flange 38. In another embodiment, an adhesive (not shown) may be provided between the corner seal 14 and the sill and/or jamb of the opening to secure or assist in the securement of the corner seal to the side wall of the structure.

The sill seal 12 may be attached to the corner seal 14 by aligning the free end of the sill seal with an edge of the stop member 46 opposite the vertical portion 36 of the corner seal 14 (or by spacing the free end of the sill seal with an edge of the stop 46). In embodiments not including the stop member 46, the free end of the sill seal 12 may be aligned with or spaced from the vertical portion 36 of the corner seal 14. The sill seal 12 may be pressed down upon the corner seal 14 so that the bead 44 of the corner seal snaps into or otherwise is received in the groove 22 of the sill seal and so that the lower surfaces of the horizontal and oblique portions 16, 20 of the sill seal come into contact with and become adhered to the adhesive 48 disposed on the corner seal (or on the underside of the sill seal). In an embodiment, the adhesive 48 could be omitted and the bead/groove joint could be relied upon to secure the sill seal to the corner seal. Screws 54 or other fasteners (not shown) could be driven through the holes 52 in the outer flange 18 of the sill seal to secure the sill seal to the side wall of the structure.

A bulb seal as discussed above could be attached to the outwardly-facing surface of the outer flange 18 of the sill seal 12 by inserting a tab of the seal into the tab receiving channel 30 of the sill seal and engaging a latch of the seal with the first latch 32 of the sill seal.

In use, the wiper 28 may wipe moisture from the bottom of a slide out room slidably disposed within the opening in the side wall of the structure when the slide out room is moved from the extended position to the retracted position. The wiped moisture may collect on the horizontal portions 16, 34 of the sill and corner seals 12, 14 and drain off into the environment outside the structure. Some moisture may collect in the trough 56 on the inward side of the wiper 28. This moisture may be communicated from the trough 56 through the weep holes 26 to the horizontal portion of the sill seal 12, from which it may drain into the environment. The sill and corner seals 12, 14 may be configured so that the horizontal portions 16, 34, thereof are canted outwardly to facilitate such draining.

Although the disclosure shows and describes a seal system for use in sealing an interface between an opening in a sidewall of a structure, for example, a recreational vehicle, and a slide out room configured to extend and retract through the opening, the seal system could be used to seal an interface between an opening in a side wall of another form of structure and any other form of slide out compartment configured to extend and retract through the opening.

The invention claimed is:

1. A seal system for a slide out room of a recreational vehicle, comprising:
   a sill seal comprising:
   a horizontal portion having a first edge and a second edge;
   a first vertical flange extending downwardly from said horizontal portion proximate said first edge of said horizontal portion;
   an oblique portion extending upwardly from said horizontal portion proximate said second edge of said horizontal portion at an obtuse angle thereto;
   a second vertical flange extending from said horizontal portion proximate said second edge of said horizontal portion, said second vertical flange comprising a plurality of weep holes proximate a junction of said second vertical flange with said horizontal portion, and
   a wiper attached to and extending upwardly from said second vertical flange of said sill seal,
   said plurality of weep holes configured to allow communication of water wiped by the wiper through said second vertical flange;
   said second vertical flange and said oblique portion cooperating to define a trough therebetween; and
   a corner seal comprising:
   a horizontal portion having a first side, a second side, a first edge, and a second edge;
   an oblique portion having a first end and a second end, said oblique portion extending upwardly and outwardly from said second edge of said horizontal portion;
   a vertical portion extending upwardly from said second end of said horizontal portion and connected to said second end of said oblique portion; and a vertical flange extending downwardly from said first end of said horizontal portion and outwardly from said vertical portion;

wherein at least a portion of said horizontal portion of said sill seal overlies at least a portion of said horizontal portion of said corner seal; and wherein at least a portion of said oblique portion of said sill seal overlies at least a portion of said oblique portion of said corner seal.

2. The seal system of claim 1, said oblique portion of said sill seal further comprising a free edge, said free edge of said sill seal comprising an elongated channel, and said oblique portion of said corner sill further comprising a free edge, said free edge of said corner seal comprising an elongated bead, wherein said elongated bead is received within said elongated channel.

3. The seal system of claim 1, said corner seal further comprising a stop member attached to said horizontal portion and spaced from said vertical portion.

4. The seal system of claim 1 further comprising an adhesive disposed between one of said horizontal portion and said oblique portion of said sill seal and a corresponding one of said horizontal portion and said oblique portion of said corner seal.

5. The seal system of claim 1, said sill seal further comprising a bulb seal attached to said first vertical flange.

6. The seal system of claim 1, said sill seal further comprising:

a tab-receiving channel extending outwardly from said first vertical flange; and a first latch member extending outwardly from said first vertical flange.

7. The seal system of claim 6 further comprising a bulb seal removably attached to said first vertical flange, said bulb seal comprising a tab selectively received within said tab-receiving channel, and a second latch member selectively engaged with said first latch member.

8. A sill seal for a slide out room of a recreational vehicle, comprising:

a horizontal portion having a first edge and a second edge;

a first vertical flange extending downwardly from said horizontal portion proximate said first edge of said horizontal portion;

an oblique portion extending upwardly from said horizontal portion proximate said second edge of said horizontal portion at an obtuse angle thereto;

a second vertical flange extending from said horizontal portion proximate said second edge of said horizontal portion, said second vertical flange comprising a plurality of weep holes proximate a junction of said second vertical flange with said horizontal portion; and a wiper attached to and extending upwardly from said second vertical flange of said sill seal, said plurality of weep holes configured to allow communication of water wiped by the wiper through said second vertical flange;

said second vertical flange and said oblique portion cooperating to define a trough there between.

9. The sill seal of claim 8, said oblique portion further comprising a free edge, said free edge of said sill seal comprising an elongated channel.

10. The sill seal of claim 8 further comprising a bulb seal attached to said first vertical flange.

11. The sill seal of claim 8 further comprising:

a tab-receiving channel extending outwardly from said first vertical flange; and a first latch member extending outwardly from said first vertical flange.

12. The sill seal of claim 11 further comprising a bulb seal removably attached to said first vertical flange, said bulb seal comprising a tab selectively received within said tab-receiving channel, and a second latch member selectively engaged with said first latch member.

13. The sill seal of claim 11 further comprising a bulb seal attachable to said first vertical flange, said bulb seal comprising a tab receivable within said tab-receiving channel, and a second latch member engagable with said first latch member.

14. The sill seal of claim 8 wherein said horizontal portion is imperforate.

\* \* \* \* \*